(12) United States Patent
Przymusinski et al.

(10) Patent No.: US 6,196,184 B1
(45) Date of Patent: Mar. 6, 2001

(54) METHOD AND DEVICE FOR DETECTING A PREINJECTION IN AN INTERNAL COMBUSTION ENGINE

(75) Inventors: Achim Przymusinski, Regensburg; Ralf Böhnig, Neutraubling, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/408,464

(22) Filed: Sep. 29, 1999

(30) Foreign Application Priority Data

Sep. 29, 1998 (DE) .............................. 198 44 746

(51) Int. Cl.⁷ .............................. F02B 3/10; F02D 41/04
(52) U.S. Cl. .................... 123/299; 123/435; 701/111; 701/115; 73/35.11
(58) Field of Search .................... 123/299, 300, 123/435, 436; 73/115, 35.09, 35.11, 116, 117.3, 119 A; 701/103, 111, 115

(56) References Cited

U.S. PATENT DOCUMENTS

| 4,761,993 | * | 8/1988 | Klepacki | 73/115 |
| 5,373,448 | * | 12/1994 | Katogi et al. | 701/111 |
| 5,535,722 | * | 7/1996 | Graessley et al. | 123/435 |
| 5,865,153 | * | 2/1999 | Matsumoto | 123/299 |
| 6,062,189 | * | 5/2000 | Kaneko et al. | 123/299 |
| 6,062,193 | * | 5/2000 | Gatellier | 123/299 |
| 6,082,326 | * | 7/2000 | Schietecatte et al. | 123/299 |

FOREIGN PATENT DOCUMENTS

| 3929747A1 | 3/1991 | (DE) . |
| 3935 937 C2 | 6/1992 | (DE) . |
| 4312587A1 | 10/1994 | (DE) . |
| 195 48 526 A1 | 7/1997 | (DE) . |

* cited by examiner

Primary Examiner—Willis R. Wolfe
(74) Attorney, Agent, or Firm—Herbert L. Lerner; Laurence A. Greenberg; Werner H. Stemer

(57) ABSTRACT

A method for detecting a preinjection picks up and evaluates a vibration signal which occurs when a nozzle needle strikes a needle seat of an injector of a direct-injection internal combustion engine operating with a preinjection and a main injection. A sensor for structure-borne noise is provided on the cylinder outer wall for detecting the vibration signal. Based on the evaluation of the vibration signal a conclusion is made on the presence or absence of the preinjection in a combustion cycle. A device for detecting a preinjection is also provided.

11 Claims, 7 Drawing Sheets

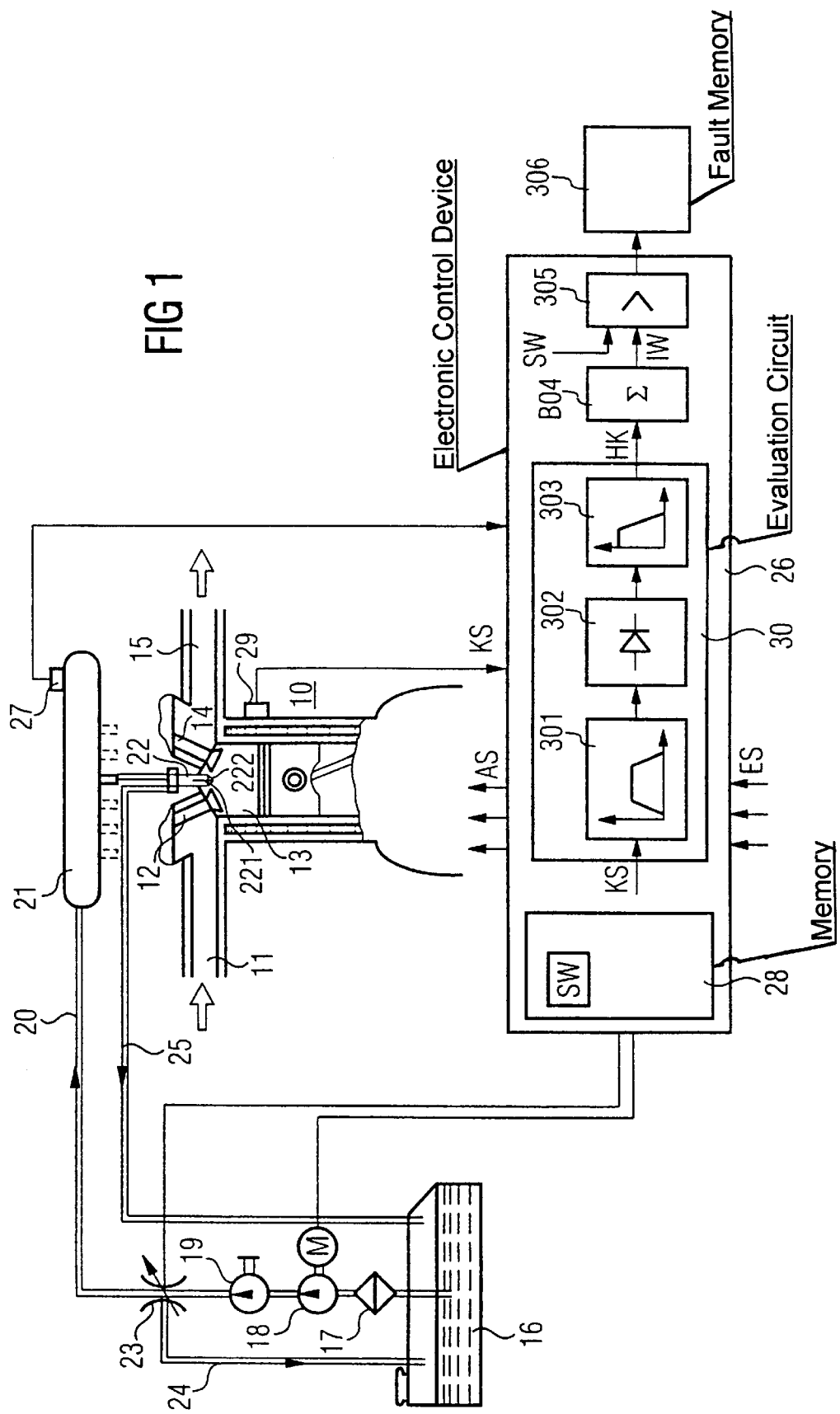

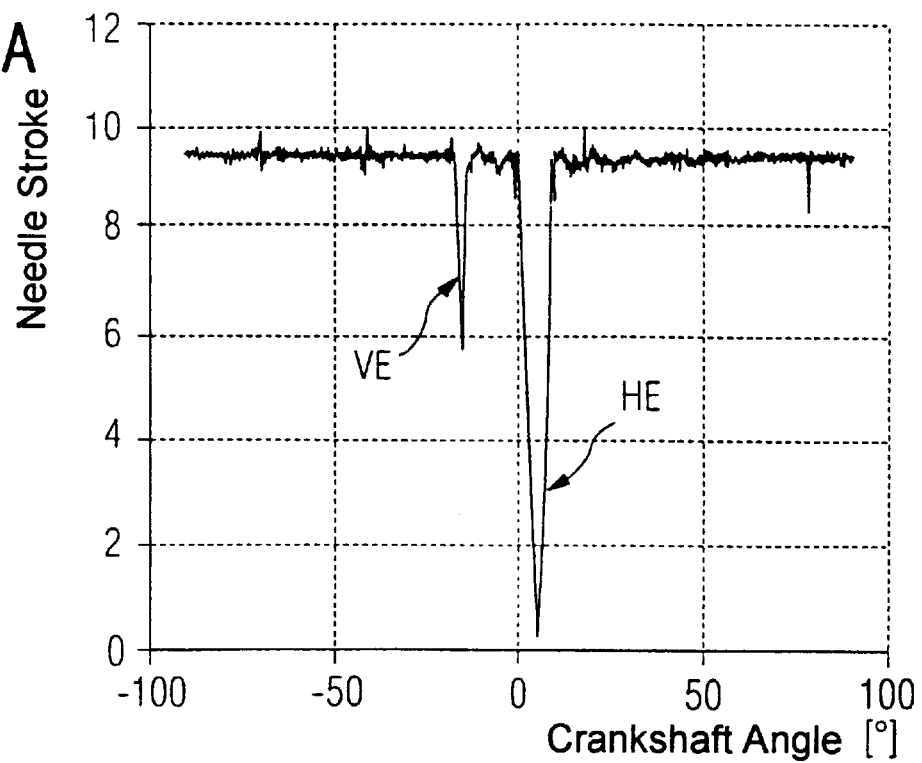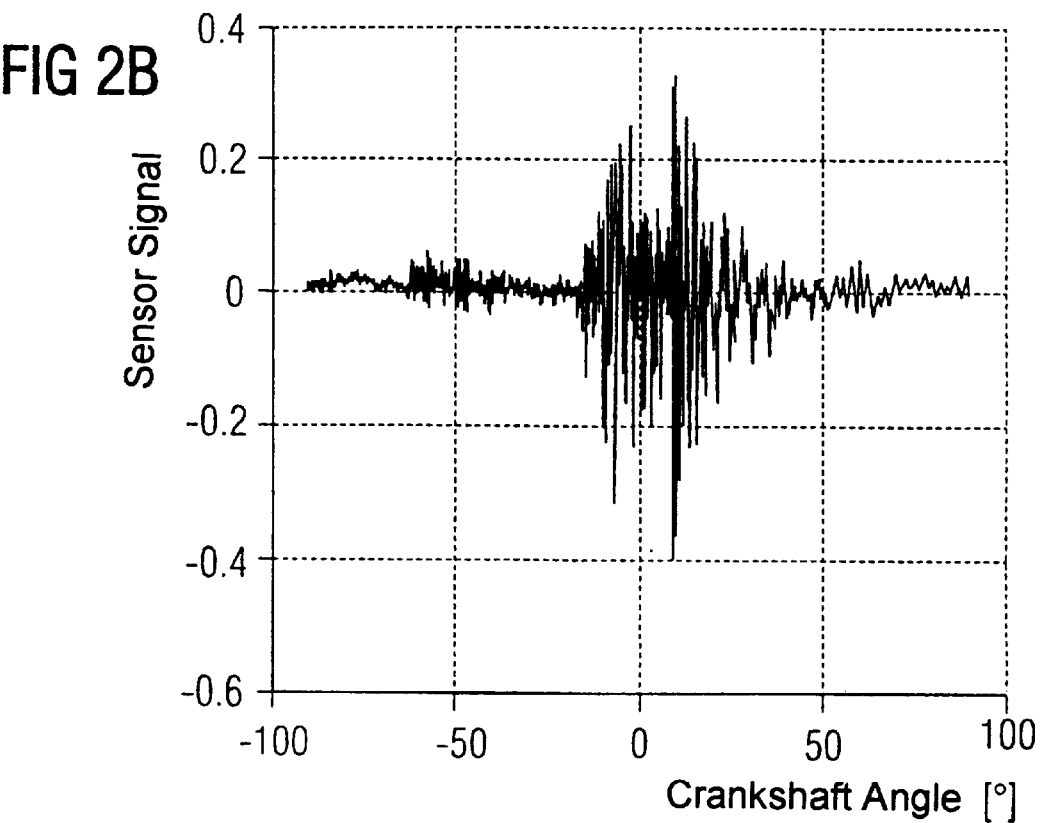

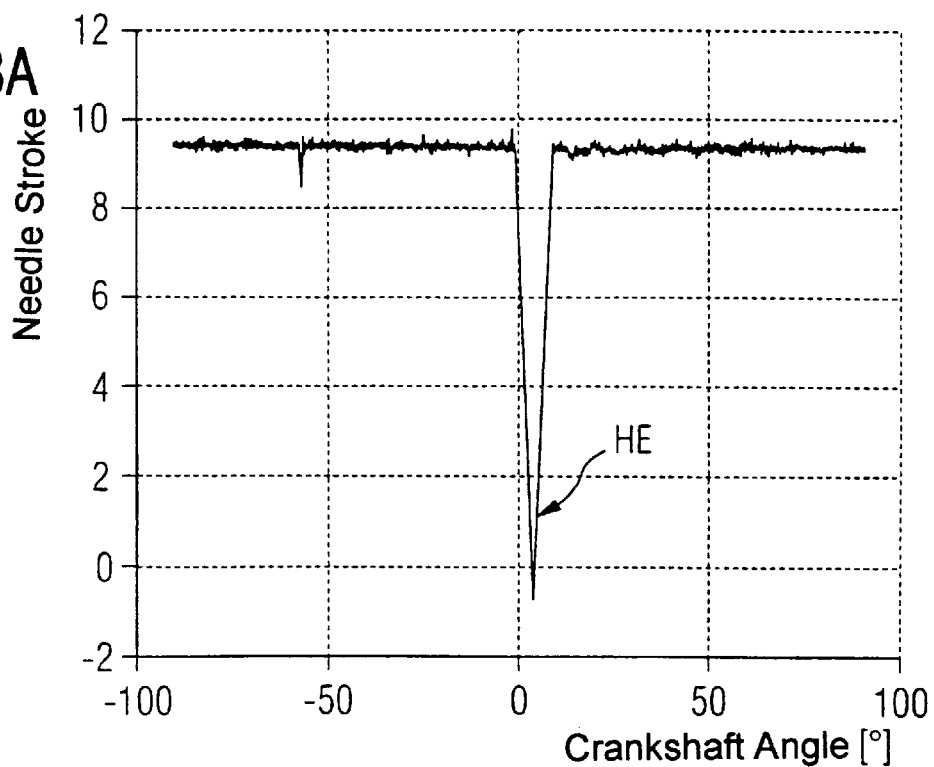
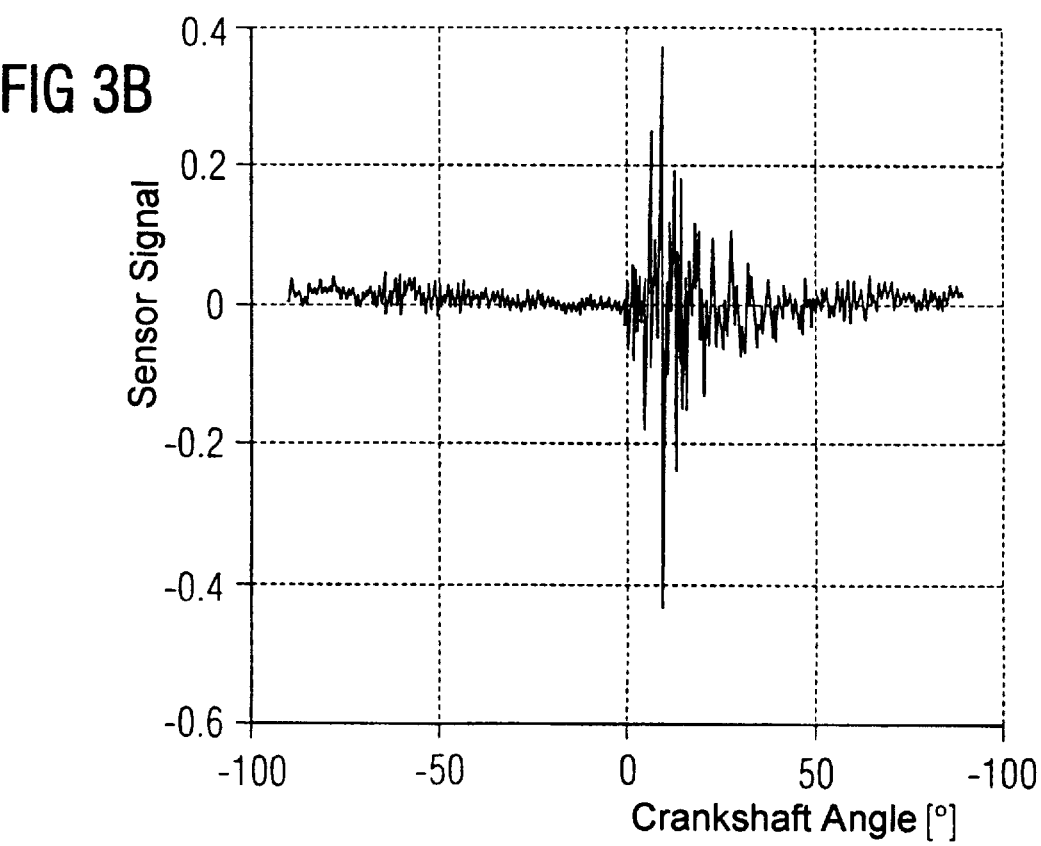

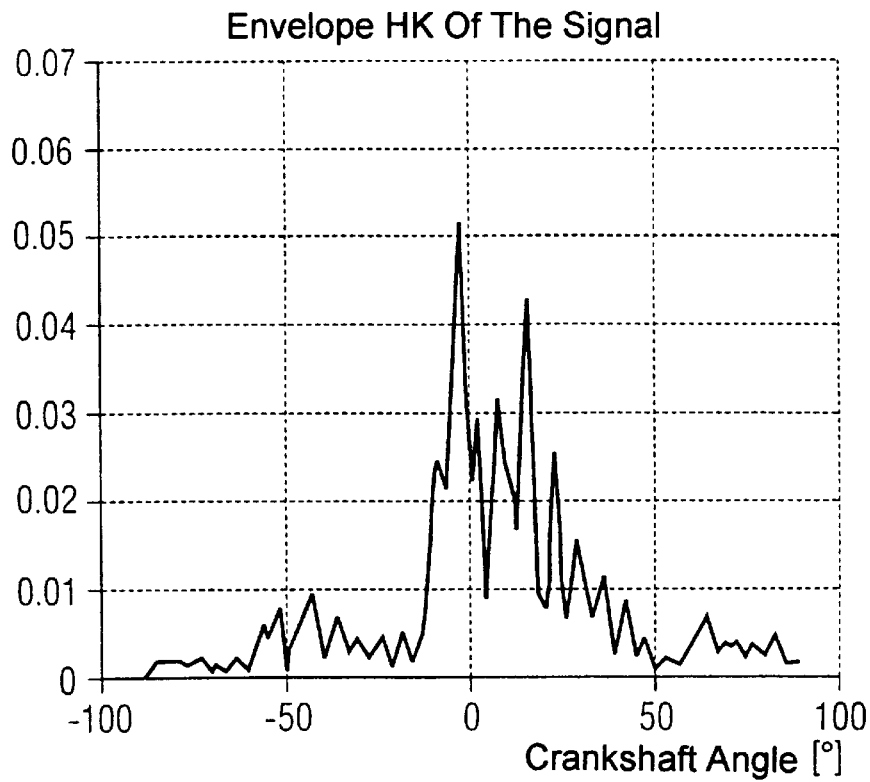
FIG 4C — Envelope HK Of The Signal
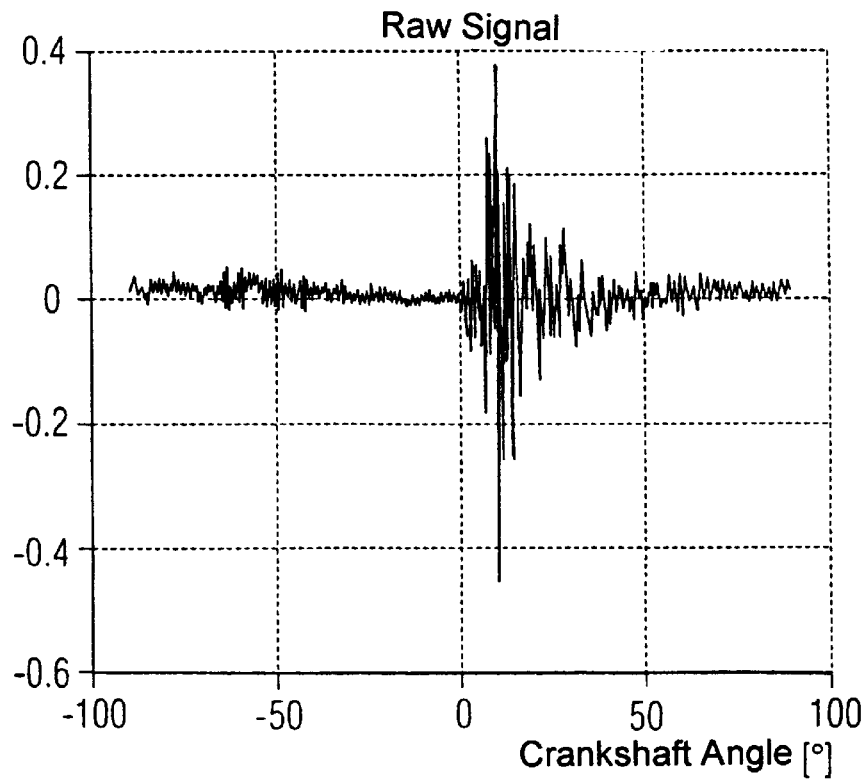
FIG 5A — Raw Signal

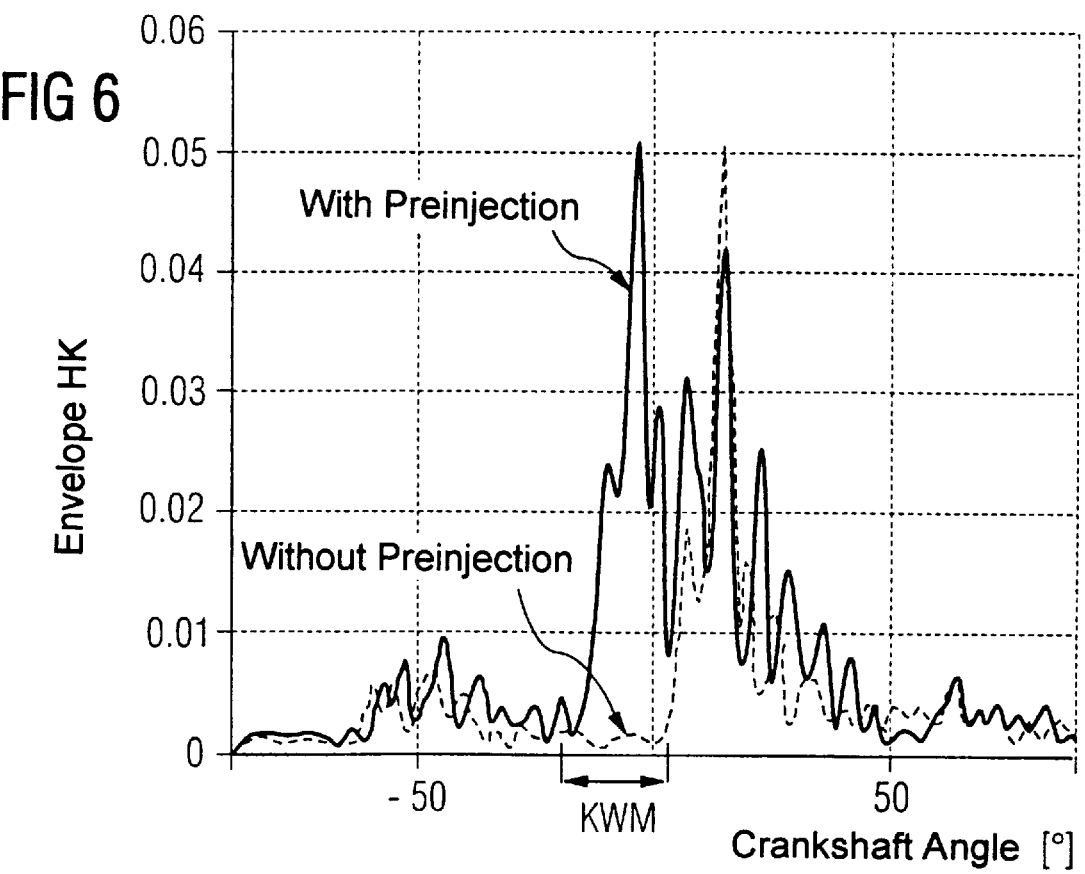
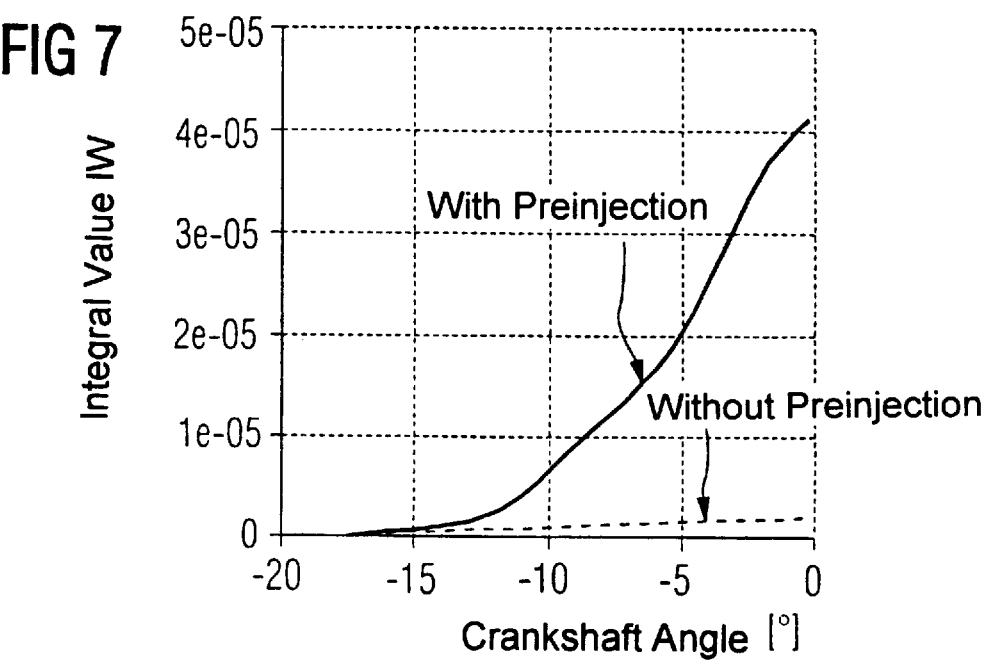

METHOD AND DEVICE FOR DETECTING A PREINJECTION IN AN INTERNAL COMBUSTION ENGINE

BACKGROUND OF THE INVENTION

Field of the Invention

The invention relates to a method and a device for detecting a preinjection in an internal combustion engine operating with a direct injection.

Internal combustion engines using a direct fuel injection have a considerable potential for reducing the fuel consumption combined with a relatively low pollutant emission. Unlike with a manifold fuel injection, with a direct fuel injection, fuel is injected directly into the combustion chamber at a high pressure.

Injection systems with a central pressure accumulator (common-rail) are known for this purpose. In such common-rail systems, a high-pressure pump is used to build up in the common rail a fuel pressure, which is controlled by an electronic controller of the internal combustion engine via a pressure sensor and a pressure controller and which is available substantially independently of the engine speed and injection quantity. The fuel is injected into the combustion chamber via an injector having a solenoid valve or a piezoelectric valve. The injector receives its signals from the controller. Owing to the functional separation of pressure production and injection, the injection pressure can be selected substantially independently of a current operating point of the internal combustion engine.

The combustion noise of an internal combustion engine operating with direct injection, in particular the noise of a diesel internal combustion engine, can be substantially reduced when the calculated fuel quantity is not injected at once, but is distributed over two injection processes per cylinder stroke. In this case, a quantity of fuel, which is small compared to the total quantity to be injected and is also known as a pilot quantity, is injected during a preinjection process, and the main quantity is injected after a period which depends, as a rule, on the operating point of the interna combustion engine and is expressed in degrees of crank angle (see for example Published German Patent Application DE 39 35 937 A1). A reduction in the pressure gradient in the combustion chamber is thereby achieved, as a result of which the noise behavior of the combustion and thus of the internal combustion engine is substantially improved.

Without a preinjection, not only the noise behavior of the internal combustion engine is worse, but also the exhaust emissions increase.

SUMMARY OF THE INVENTION

It is accordingly an object of the invention to provide a simple and cost-effective method and device for detecting a preinjection process in an internal combustion engine.

With the foregoing and other objects in view there is provided, in accordance with the invention, a method for detecting a preinjection in an internal combustion engine operating with a direct injection. The method comprises the steps of:

metering fuel, with at least one injector having a nozzle needle and a needle seat assigned to the nozzle needle, the fuel being split up into a preinjection and a main injection;

detecting within a measuring window, with a sensor for structure-borne noise, a vibration signal generated by the nozzle needle when striking the needle seat; and deriving a criterion for detecting an occurrence of the preinjection based on an intensity of the detected vibration signal.

In accordance with another mode of the invention, the vibration signal is rectified; an envelope curve is formed for the rectified vibration signal; the area under the envelope curve is determined; the area under the envelope curve is compared with a given threshold value; and, when the given threshold is exceeded in the comparing step, a conclusion is made that the preinjection has occurred.

In accordance with yet another mode of the invention, an entry into a fault memory is made when the given threshold value is not exceeded in the comparing step.

In accordance with a further mode of the invention, a fault information is optically displayed or acoustically communicated to an operator of a vehicle having an internal combustion engine, when the given threshold value is not exceeded in the comparing step.

With the objects of the invention in view there is also provided, a device for detecting a preinjection in an internal combustion engine operating with a direct injection, comprising:

at least one injector having a nozzle needle and a needle seat assigned to the nozzle needle for metering fuel split up into a preinjection and a main injection;

a sensor for structure-borne noise disposed on an internal combustion engine for picking up a vibration signal generated by the nozzle needle on striking the needle seat;

an evaluation circuit for generating an envelope curve of the vibration signal;

a calculating device for calculating an area below the envelope curve;

a comparator for comparing the area with a given threshold value; and a storage device for storing and indicating a fault when the given threshold value is undershot.

In accordance with another feature of the invention, the evaluation circuit, the calculating device, and the comparator are incorporated in a control device which controls an operation of an internal combustion engine.

In accordance with yet another feature of the invention, the evaluation circuit and the calculating device are incorporated in the sensor for structure-borne noise.

In accordance with a further feature of the invention, the evaluation circuit includes a bandpass filter for filtering the vibration signal, a rectifier for rectifying the filtered vibration signal, and a low-pass filter for generating the envelope curve.

In accordance with yet a further feature of the invention, the calculating device includes an integrator for calculating the area under the envelope curve.

In accordance with an added feature of the invention, the sensor for structure-borne noise is a knock sensor operating in accordance with a piezoelectric principle.

By picking up and evaluating the vibration signal, which occurs when the nozzle needle strikes the needle seat, with a sensor for structure-borne noise in the form of a commercially available knock sensor disposed on the outer wall of a cylinder, it is possible to make a conclusion on the presence or absence of the preinjection in a combustion cycle. In the case where there is no preinjection, the fault is stored, the fault is displayed to the driver, and measures can be initiated to reduce the emissions, which occur to an increased degree when the fault occurs.

Other features which are considered as characteristic for the invention are set forth in the appended claims.

Although the invention is illustrated and described herein as embodied in a method and device for detecting a preinjection in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram of a direct-injection internal combustion engine with a high-pressure accumulator and an associated control device;

FIGS. 2A and 2B are diagrams of a needle stroke characteristic and a structure-borne noise signal, as a function of a crankshaft angle with preinjection;

FIGS. 3A and 3B are diagrams of the needle stroke characteristic and the structure-borne noise signal, as a function of the crankshaft angle without preinjection;

FIGS. 4A–4C and 5A–5C are diagrams illustrating the generation of envelope curves with and without preinjection;

FIG. 6 is a diagram of two envelope curves of the sensor signal; and

FIG. 7 is a diagram of the integral values of the envelope curves shown in FIG. 6.

DESCRIPTION OF THE PREFERRED EMBODIMENTS

Figure 4A:
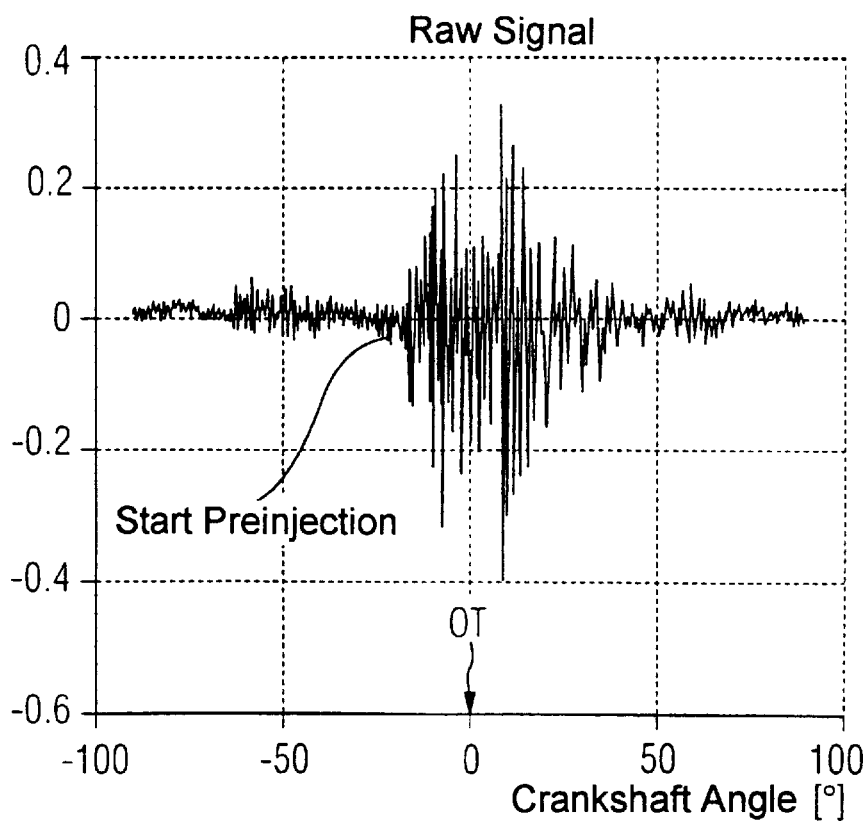

Referring now to the figures of the drawings in detail and first, particularly, to FIG. 1 thereof, there is shown a schematic block diagram of the technical environment in which the invention is used. In this case, only those parts are represented which are necessary to understand the invention. Reference numeral 10 denotes a diesel internal combustion engine which is fed the air required for combustion via an induction pipe 11 and an inlet valve 12. Together with the cylinder inner walls, a piston delimits a combustion chamber 13. The exhaust gas passes into an exhaust-gas duct 15 via an outlet valve 14.

The fuel supply system of the internal combustion engine 10 has a fuel tank 16 which is connected via a fuel filter 17 and a presupply pump 18 to a high-pressure pump 19 which delivers fuel at a high pressure into a high-pressure line 20. The high-pressure line 20 is connected to an injection rail 21 which has injectors 22 in the form of injection valves which inject fuel into the combustion chambers 13 of the internal combustion engine 10. The injection rail 21 is preferably constructed as a high-pressure accumulator (common rail). The injection valve 22 is provided in this case as a piezo-electric servo injector which has a nozzle needle 221 which, in the non-activated state of the piezoelectric actuator, bears against a needle seat 222 because of the full rail pressure. The construction and the function of such a piezoelectric injector is described, for example, in the German Patent Application DE 195 48 526 A1. However, instead of a piezoelectric injector it is also possible to use a conventional solenoid injector whose needle is opened and closed trough the use of an electromagnetically actuated control valve.

The high-pressure line 20 has a controllable pressure actuator 23 which constitutes, for example, a controllable pump or a pressure control valve, and which is connected to the fuel tank 16 via a leakage line 24. The injectors 22 are connected to a second leakage line 25 which likewise leads to the fuel tank 16. The pressure actuator 23 is connected to an electronic control device (ECU) 26 via a control line. The same applies to the presupply pump 18. The high-pressure pump 19 can be driven either by the internal combustion engine itself, for example by the crankshaft, or electrically. The control device 26 is, moreover, connected to a pressure sensor 27 which is provided on the injection rail (common rail) 21 and detects the fuel pressure in the injection rail 21, and thus the pressure in the high-pressure region.

The general function of such a direct-injection system with a high-pressure accumulator is known, and will therefore not be described in more detail.

The control device 26 has access to a memory 28 in which, inter alia, a threshold value SW is stored whose significance will be explained in further detail in the description of FIG. 7. Fitted at a suitable point on an outer wall of the cylinder block of the internal combustion engine 10 is a sensor 29 for structure-borne noise which detects a noise signal which is caused by the closing of the nozzle needle 221 and the striking of the nozzle needle against the needle seat 222 of the injection valve during the preinjection process. This output signal of the sensor 29 for structure-borne noise is transmitted to the control device 26 for further processing and evaluation. In order, in the case of internal combustion engines with 6 or more cylinders, to increase the accuracy and, in particular, the speed (propagation time between the occurrence of the noise and the site of the detection) of the noise detection, it is also possible to provide a plurality of sensors for structure-borne noise at appropriate points on the engine block.

The control device 26 has further inputs, commonly denoted as ES, via which data required to operate the internal combustion engine, such as load or temperature, are fed to it. Further output variables of the control device for controlling various actuators are denoted as AS.

The needle stroke or needle travel characteristic of the nozzle needle 221, plotted against the crankshaft angle, is represented in FIG. 2A, fuel being injected directly into the combustion chamber during a preinjection (VE) and a main injection (HE). FIG. 2B shows the associated characteristic of the structure-borne noise signal when the nozzle needle 221 strikes the needle seat 222 during the closing operation.

FIG. 3A shows the needle stroke characteristic, and FIG. 3B shows the structure-borne noise signal occurring when no preinjection, but only a main injection (HE), takes place. In both cases, the main injection (HE) is initiated at the crankshaft angle 0° (top dead center).

The structure-borne noise signal, which is measured trough the use of the knock sensor, is of mechanical origin and is not caused by the preinjected fuel mass. The structure-borne noise signal is caused by the nozzle needle when it abruptly drops back into the needle seat.

The method for detecting the preinjection is represented below by way of example for an internal combustion engine at an operating point with a speed of 1500 rpm and a fuel injection quantity of 25 mg/stroke.

The method is based on forming the envelope of the raw, unprocessed noise signal, which is picked up directly by the knock sensor 29. For this purpose, the output signal KS of the knock sensor 29 is fed to an evaluation circuit 30 which is integrated into the control device 26. The evaluation circuit 30 has a bandpass filter 301 which is used to filter out, from the vibration signal, the frequency band relevant for the detection of the injector noise. This frequency band is obtained by comparing the power density spectra of two operating cycles. In one operating cycle, normal preinjection was performed, and in the other the preinjection was switched off. Only the time interval (window) relevant to the preinjection is considered for the formation of the power density spectrum.

Subsequently, the filtered signal is rectified trough the use of a rectifier 302. This rectified signal is thereafter filtered with a low-pass filter 303 having a low cut-off frequency. The envelope HK of the signal KS is obtained in this way. In the example described for the evaluation circuit 30, a bandpass filter with cut-off frequencies at 7 kHz and 15 kHz is used. An absolute element which folds the negative signal components upward (positive quadrant) serves as a rectifier. The low-pass filter, which generates the envelope, operates with a cut-off frequency of 2 kHz.

Figure 4B:
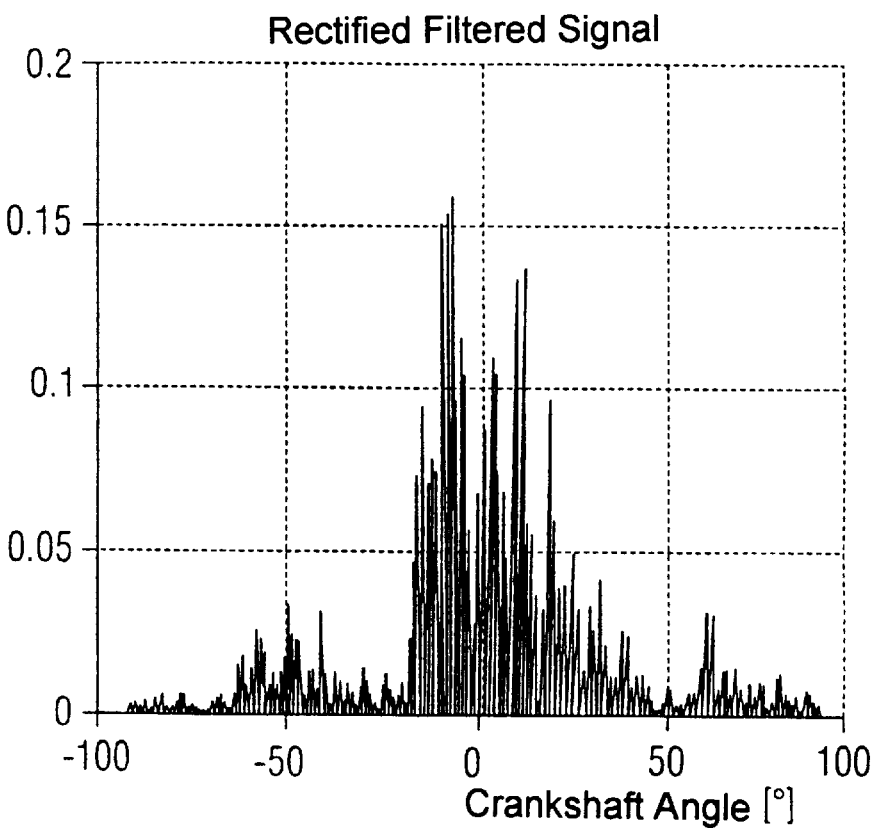
Figure 5B:
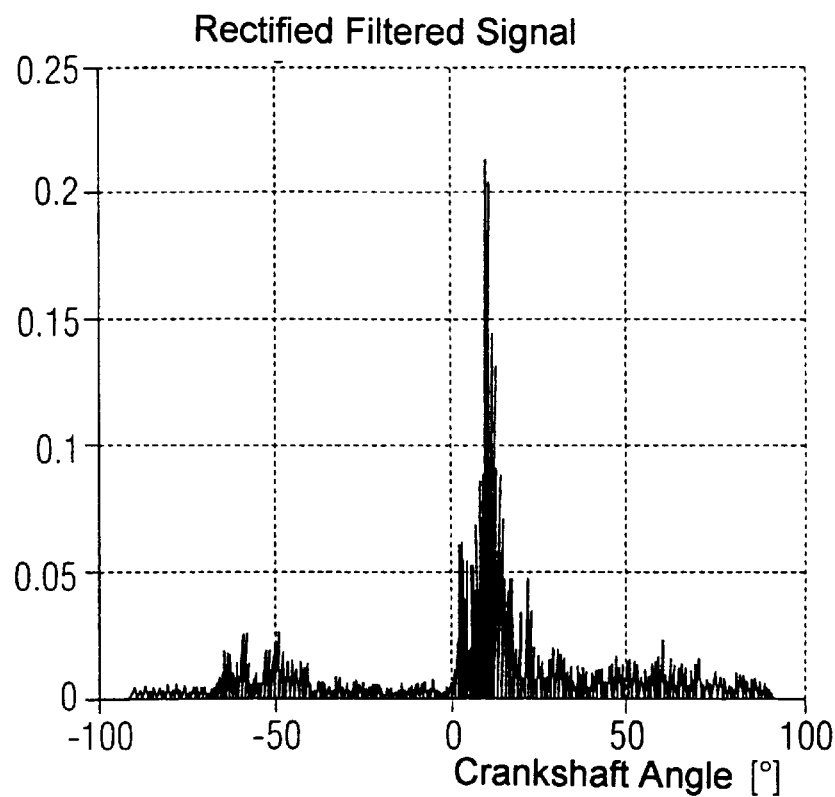
Figure 5C:
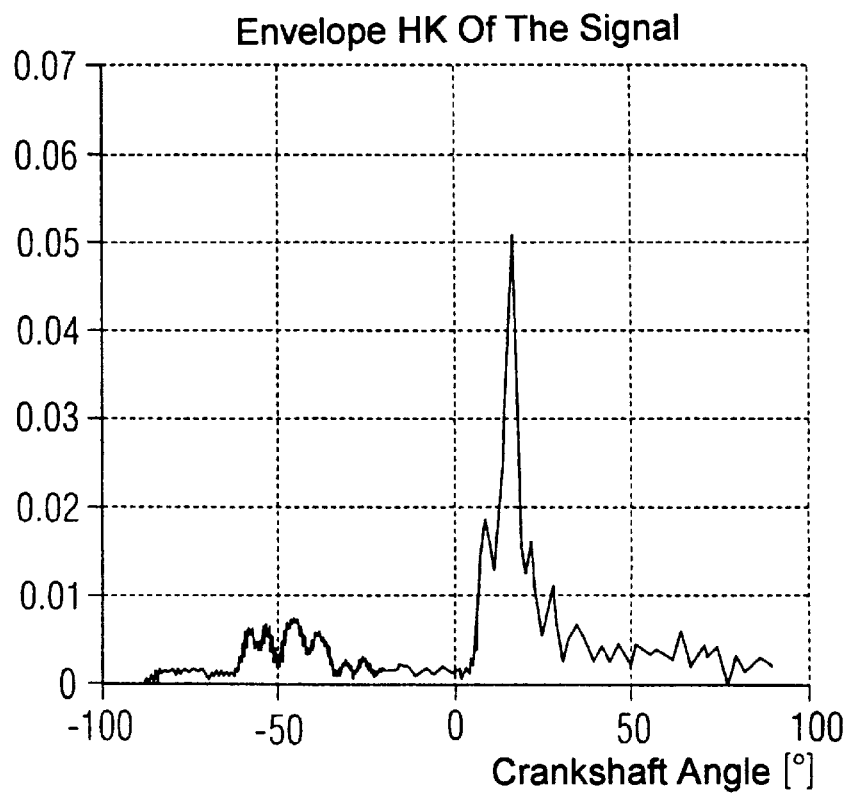

The signal characteristics of the raw signal KS, and at the output of the individual filters 301, 302, and 303, are represented in FIGS. 4 and 5. FIGS. 4A to 4C illustrate the conditions for a main injection and a preinjection, and FIGS. 5A to 5C show the conditions for an injection process with only a main injection.

Both envelopes are illustrated for comparison in FIG. 6 as a function of the crankshaft angle. The continuous line results when there is a preinjection, and the dashed line results when no preinjection takes place. However, it is only the range from the desired start of the preinjection to the start of the main injection which is relevant for distinguishing the envelopes. This range, specified in degrees of crankshaft angle, and also denoted as measuring window KWM, is likewise plotted in FIG. 6. It may be seen from this representation that no signal components, or only negligibly small ones, are present at a time before the top dead center (00 °crankshaft angle) when no preinjection is provided.

The area under the envelope in the above-mentioned measuring window KWM is evaluated as a criterion for deciding whether a preinjection has taken place or not in the cylinder during an operation cycle (combustion cycle). For this purpose, the envelope signal HK is fed to an integrator 304 which calculates the area under the envelope HK and outputs it as integral value IW.

A comparison of the areas under the envelope during the preinjection, that is to say of a time inside the measuring window KWM, is presented in FIG. 7. The dashed line in this case specifies the characteristic of the integral value IW and, correspondingly, the area for the case when there is no preinjection, as a function of the crankshaft angle. The continuous line, by contrast, specifies the characteristic for a combustion cycle with a preinjection.

The integral value IW is supplied to an input of a comparator 305 which compares this value with the stored threshold value SW. If the integral value IW is above the threshold value SW, it is concluded that preinjection has taken place, otherwise an entry is made into a fault memory or storage device 306 and the fault is displayed optically and/or acoustically to the vehicle driver.

The method and the device have been explained with reference to an example in which the evaluation circuit of the signal supplied by the sensor for structure-borne noise is situated in the control device of the internal combustion engine. However, a knock sensor in which the evaluation circuit is integrated is also suitable for the practical implementation of this method. Such a knock sensor, which may be used within the scope of knock control in the case of spark-ignition internal combustion engines, is for example the knock IC ATM 40 of the company Siemens.

We claim:

1. A method for detecting a preinjection in an internal combustion engine operating with a direct injection, the method which comprises:

metering fuel, with at least one injector having a nozzle needle and a needle seat assigned to the nozzle needle, the fuel being split up into a preinjection and a main injection;

detecting within a measuring window, with a sensor for structure-borne noise, a vibration signal generated by the nozzle needle when striking the needle seat; and deriving a criterion for detecting an occurrence of the preinjection based on an intensity of the detected vibration signal.

2. The method according to claim 1, which comprises:

rectifying the vibration signal for generating a rectified vibration signal;

forming an envelope curve for the rectified vibration signal;

determining an area under the envelope curve;

comparing the area under the envelope curve with a given threshold value; and concluding that the preinjection has occurred, when the given threshold is exceeded in the comparing step.

3. The method according to claim 2, which comprises making an entry into a fault memory when the given threshold value is not exceeded in the comparing step.

4. The method according to claim 2, which comprises optically displaying a fault information to an operator of a vehicle having an internal combustion engine, when the given threshold value is not exceeded in the comparing step.

5. The method according to claim 2, which comprises acoustically communicating a fault information to an operator of a vehicle having an internal combustion engine, when the threshold value is not exceeded in the comparing step.

6. A device for detecting a preinjection in an internal combustion engine operating with a direct injection, comprising:

at least one injector having a nozzle needle and a needle seat assigned to said nozzle needle for metering fuel split up into a preinjection and a main injection;

a sensor for structure-borne noise disposed on an internal combustion engine for picking up a vibration signal generated by said nozzle needle on striking said needle seat;

an evaluation circuit for generating an envelope curve of the vibration signal;

a calculating device for calculating an area below the envelope curve;

a comparator for comparing the area with a given threshold value; and a storage device for storing and indicating a fault when the given threshold value is undershot.

7. The device according to claim 6, including a control device controlling an operation of an internal combustion engine, said evaluation circuit, said calculating device, and said comparator being incorporated in said control device.

8. The device according to claim 6, wherein said evaluation circuit and said calculating device are incorporated in said sensor for structure-borne noise.

9. The device according to claim 6, wherein said evaluation circuit includes a bandpass filter for filtering the vibration signal and generating a filtered vibration signal, a rectifier for rectifying the filtered vibration signal, and a low-pass filter for generating the envelope curve.

10. The device according to claim 6, wherein said calculating device includes an integrator for calculating the area under the envelope curve.

11. The device according to claim 6, wherein said sensor for structure-borne noise is a knock sensor operating in accordance with a piezoelectric principle.

* * * * *